United States Patent
Negishi et al.

(10) Patent No.: US 8,293,145 B2
(45) Date of Patent: Oct. 23, 2012

(54) OPTICAL FILM

(75) Inventors: Yoshinori Negishi, Saitama (JP); Genta Harada, Saitama (JP); Hiroshi Yamanoi, Saitama (JP)

(73) Assignee: Adeka Corporation, Tokyo (JP)

( * ) Notice: Subject to any disclaimer, the term of this patent is extended or adjusted under 35 U.S.C. 154(b) by 0 days.

(21) Appl. No.: 12/995,580

(22) PCT Filed: Jun. 29, 2009

(86) PCT No.: PCT/JP2009/061880
§ 371 (c)(1),
(2), (4) Date: Dec. 1, 2010

(87) PCT Pub. No.: WO2010/004901
PCT Pub. Date: Jan. 14, 2010

(65) Prior Publication Data
US 2011/0121245 A1    May 26, 2011

(30) Foreign Application Priority Data
Jul. 10, 2008 (JP) ................... 2008-179678

(51) Int. Cl.
*F21V 9/00* (2006.01)
*C07D 413/00* (2006.01)
*C07D 251/00* (2006.01)
*C09K 19/00* (2006.01)

(52) U.S. Cl. ............ 252/582; 544/83; 544/216; 428/1.3

(58) Field of Classification Search ............ 544/83, 544/216; 536/47, 52, 58; 523/122; 428/13, 428/522, 532
See application file for complete search history.

(56) References Cited

U.S. PATENT DOCUMENTS

| 7,125,920 B2 * | 10/2006 | Negishi et al. ............... 524/100 |
| 2010/0247811 A1 * | 9/2010 | Yokota et al. ............... 428/1.31 |

FOREIGN PATENT DOCUMENTS

| EP | 00870797 | * 10/1998 |
| JP | 6-118233 | 4/1994 |
| JP | 6-130226 | 5/1994 |
| JP | 2000-193821 | 7/2000 |
| JP | 2001-72782 | 3/2001 |
| JP | 2001072782 | * 3/2001 |
| JP | 2001-154017 | 6/2001 |
| JP | 2002-169020 | 6/2002 |
| JP | 2003-176366 | 6/2003 |
| JP | 2006-045389 | 2/2006 |
| JP | 2006045389 | * 2/2006 |
| JP | 2007-108775 | 4/2007 |
| JP | 2007-126571 | 5/2007 |
| JP | 2007-169590 | 7/2007 |
| JP | 2007-297619 | 11/2007 |
| JP | 2009-098701 | 5/2009 |

OTHER PUBLICATIONS

International Search Report, PCT/JP2009/061880, Sep. 8, 2009.
Chinese Official Action—200980120609.X—Feb. 29, 2012; with english translation.

* cited by examiner

*Primary Examiner* — Ling Choi
*Assistant Examiner* — Monique Peets
(74) *Attorney, Agent, or Firm* — Young & Thompson

(57) ABSTRACT

Disclosed is an optical film characterized by containing 0.001-10 parts by mass of an ultraviolet absorbent represented by general formula (1) per 100 parts by mass of a cellulose ester. (In the formula, n represents an integer of 1-4; when n is 1, R represents an alkyl group having 3-30 carbon atoms, and when n is 2-4, R represents a residue obtained by removing a carboxylic acid group from an aliphatic or aromatic polybasic acid having 1-34 carbon atoms; and R1, R2, R3 and R4 independently represent a hydrogen atom or an alkyl group having 1-4 carbon atoms.)

7 Claims, No Drawings

OPTICAL FILM

TECHNICAL FIELD

The present invention relates to a cellulose ester optical film, and more particularly, to an optical film suitable as a protective film for a polarizing plate.

BACKGROUND ART

Cellulose ester films have excellent transparency and can easily be made into films having small refractive-index anisotropy, and are therefore widely used for optical applications, such as protective films for polarizing plates.

Optical films, however, are generally exposed over a prolonged time to ultraviolet rays contained in sunlight as well as ultraviolet rays contained in light sources of display devices. Accordingly, optical films turn yellowish over time and thus suffer from degradation in display quality.

Further, polarizing plates for LCDs used for gauges and indicators of automobiles, for example, also need to be heat resistant.

For these reasons, conventional optical films contain ultraviolet absorbers and anti-weathering agents. For example, Patent Document 1 proposes a method of adding a benzophenone-based ultraviolet absorber to a cellulose ester film. Patent Documents 2 to 8 propose methods of adding benzotriazole-based ultraviolet absorbers. Patent Document 9 proposes a method of adding benzotriazole-based and triazine-based ultraviolet absorbers and a hindered amine-based light stabilizer to prevent degradation and discolouration of films.

The longer life of LCDs, however, requires further improvement in weather resistance.
Citation List
Patent Document
  Patent Document 1: JP-A-6-118233
  Patent Document 2: JP-A-6-130226
  Patent Document 3: JP-A-2000-193821
  Patent Document 4: JP-A-2001-154017
  Patent Document 5: JP-A-2002-169020
  Patent Document 6: JP-A-2003-176366
  Patent Document 7: JP-A-2007-108775
  Patent Document 8: JP-A-2007-169590
  Patent Document 9: JP-A-2001-072782

SUMMARY OF THE INVENTION

Problem to be Solved by the Invention

Accordingly, an aspect of the present invention provides a cellulose ester optical film having excellent weather resistance, such as yellowing resistance and heat resistance.

Means for Solving the Problem

After diligent research to solve the above problem, Inventors have found that a cellulose ester optical film containing a triazine compound of a specific structure has excellent weather resistance, thus arriving at the present invention.

That is, the present invention provides an optical film containing, with respect to 100 parts by mass of a cellulose ester, 0.001 to 10 parts by mass of a triazine compound represented by the following general formula (1) as an ultraviolet absorber.

The optical film of the present invention preferably uses a triazine compound in which "n" in the following general formula (1) is 1, and is preferably produced by casting or melt processing. The optical film of the present invention having such features is suitably used, in particular, as a protective film for a polarizing plate.

[Chem. 1]

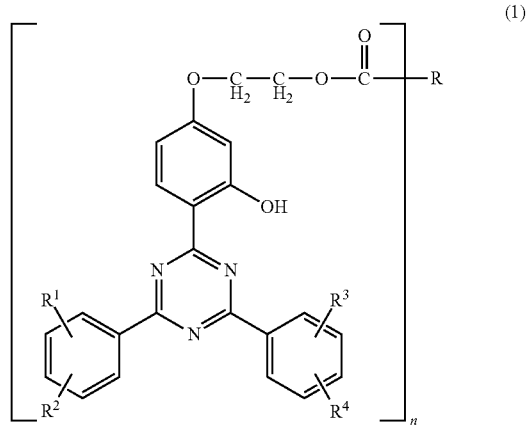

(1)

wherein, n is an integer of 1 to 4; where n is 1, R represents a $C_{3-30}$ alkyl group; where n is 2 to 4, R represents a residue obtained by removing a carboxylic acid group from a $C_{1-34}$ aliphatic or aromatic polybasic acid; and $R^1$, $R^2$, $R^3$, and $R^4$ each independently represent a hydrogen atom or a $C_{1-4}$ alkyl group.

Effect of the Invention

The present invention can provide cellulose ester optical films that are suitable as protective films for polarizing plates and that have excellent prolonged weatherproof stability.

BEST MODE FOR CARRYING OUT THE INVENTION

An optical film of the present invention will be described in detail below according to preferred embodiments.

Examples of the cellulose ester to be used for the optical film of the present invention include, although not particularly limited to, cellulose triacetate, cellulose acetate phthalate, and cellulose acetate butyrate. Among them, triacetyl cellulose is preferred from the standpoint of polarization properties and durability.

There is no particular limitation to the process according to which the optical film of the present invention is produced, but in particular, optical films produced according to either casting or melt processing are preferred.

Casting is advantageous in that the quality demanded of optical applications can easily be achieved by dissolving a cellulose ester and additives, such as ultraviolet absorbers, into a solvent and then removing foreign substances therefrom using a filter.

Examples of solvents usable for casting include: lower alcohols such as methanol, ethanol, n-propyl alcohol, isopropyl alcohol, and butanol; cyclohexane dioxanes; and chlorinated lower aliphatic hydrocarbons such as dichloromethane. An example of a preferred composition of the above solvents may include dichloromethane and another solvent mixed at a mass ratio (dichloromethane: other solvent) of 70 to 95:30 to 5. The concentration of cellulose ester in the solvent is preferably 10 to 50% by mass.

The temperature to which the solution made by adding the cellulose ester and the additive(s) to the solvent is heated preferably ranges from equal to or above the boiling point of the solvent used to a temperature at which the solvent does not boil, and is preferably set, for example, to equal to or above 60° C., and within 80° C. to 110° C. The pressure is adjusted so that the solvent does not boil at the set temperature.

After the cellulose ester and the additive(s) added to the solvent have dissolved therein, the solution or the dope (containing the cellulose ester) is either taken out from the container while being cooled or is drawn out from the container with a pump etc. and cooled with a heat exchanger, and the cooled solution/dope is made into a film, to obtain a cellulose ester film. Casting is also advantageous in that the shaping temperature can be made relative low and also degradation of resin and volatilization/diffusion of additive(s) can be kept low.

The melt processing, on the other hand, is advantageous in mass production, because the resin is shaped after being heated to temperatures equal to or above its melting point (generally 200 to 250° C.) and molten, and thus solvent removal is not necessary. However, because the resin is shaped at higher temperatures compared to casting during processing, the volatilization/diffusion of the ultraviolet absorber becomes more critical than casting. Further, in contrast to casting which employs a solvent, the molten resin exhibits higher viscosity and thus experiences difficulty when attempting purification using a filter. Furthermore, in contrast to casting which uses a solvent to disperse the additive when the additive has a low dissolubility to cellulose ester, the melt processing experiences difficulty in making the additive disperse evenly. Despite these drawbacks, the melt processing has excellent productivity as described above, and is thus preferable for securing production following the recent widespread proliferation and price-drop of flat-screen TVs.

Next, the triazine compound represented by the above general formula (1) and contained in the cellulose ester as an ultraviolet absorber will be described.

Examples of the $C_{3-30}$ alkyl group represented by R in the general formula (1) include propyl, butyl, pentyl, hexyl, heptyl, octyl, nonyl, decyl, undecyl, dodecyl, tridecyl, tetradecyl, pentadecyl, hexadecyl, and heptadecyl. These may be linear or may contain branched chains. Among these groups, a $C_{3-13}$ alkyl group is preferable, and the 2-ethylhexyl group is more preferable, from the standpoint of the effectiveness of the invention and the compatibility with the cellulose ester.

Examples of polybasic acids that constitute the residue obtained by removing a carboxylic acid group from a $C_{1-34}$ aliphatic or aromatic polybasic acid, which is represented by R in the general formula (1) include: aliphatic dibasic acids, such as malonic acid, succinic acid, glutaric acid, adipic acid, sebacic acid, azelaic acid, and dodecane dicarboxylic acid; aromatic polybasic acids, such as phthalic acid, isophthalic acid, terephthalic acid, trimellitic acid, trimesic acid, and pyromellitic acid; aliphatic polybasic acids, such as butane tricarboxylic acid, butane tetracarboxylic acid, tricarballylic acid, and citric acid; dimer acids; and hydrogenated dimer acids. Among these groups, a $C_{4-12}$ residue of a polybasic acid is preferable, and a $C_{4-6}$ residue is more preferable, from the standpoint of compatibility with the cellulose ester.

Examples of the $C_{1-4}$ alkyl group represented by $R^1$, $R^2$, $R^3$, and $R^4$ in the general formula (1) include methyl, ethyl, propyl, isopropyl, butyl, sec-butyl, and tert-butyl.

More specific examples of the triazine compound represented by the general formula (1) include, although not limited to, the following Compounds No. 1 to No. 9.

[Chem. 2]

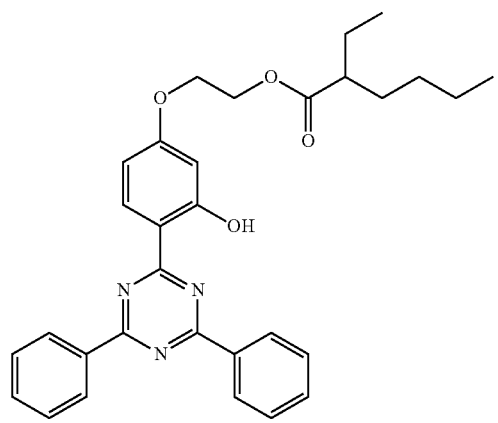

Compound No. 1

[Chem. 3]

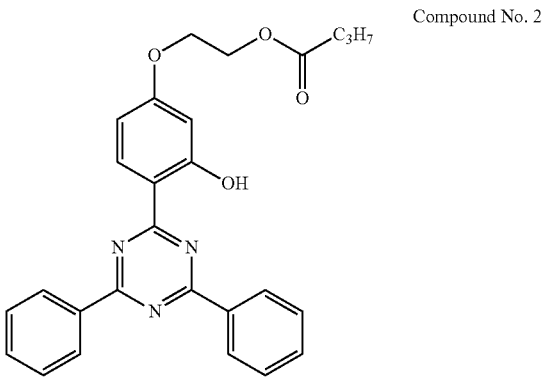

Compound No. 2

[Chem. 4]

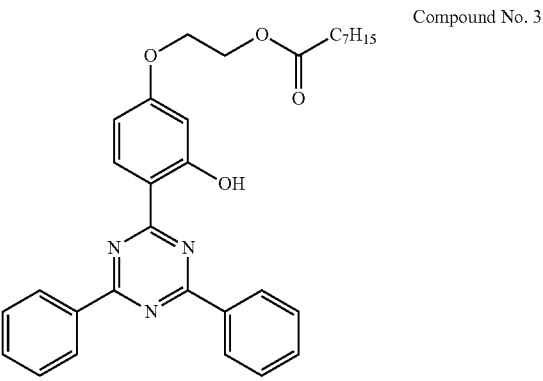

Compound No. 3

[Chem. 5]

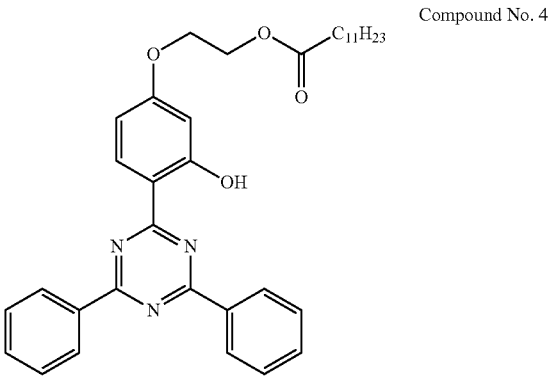

Compound No. 4

[Chem. 6]

Compound No. 5

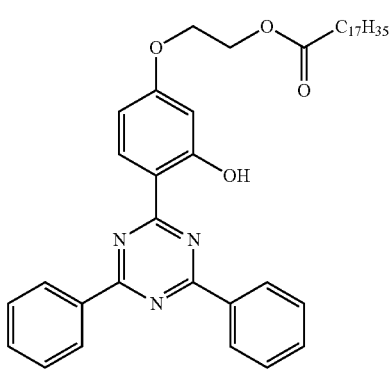

[Chem. 7]

Compound No. 6

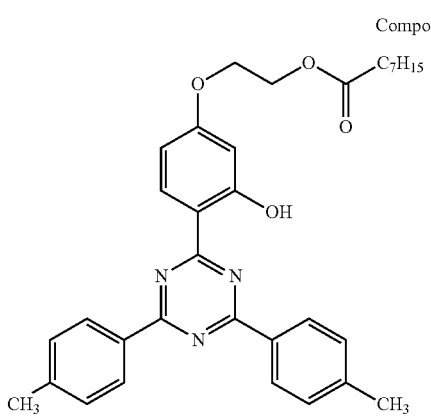

[Chem. 8]

Compound No. 7

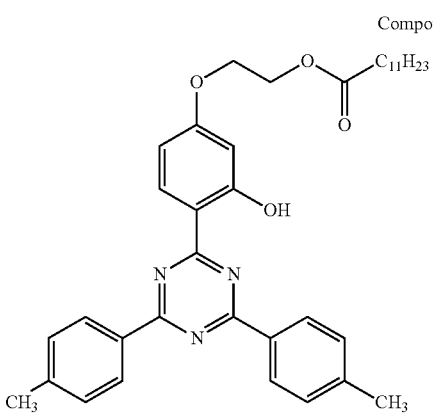

[Chem. 9]

Compound No. 8

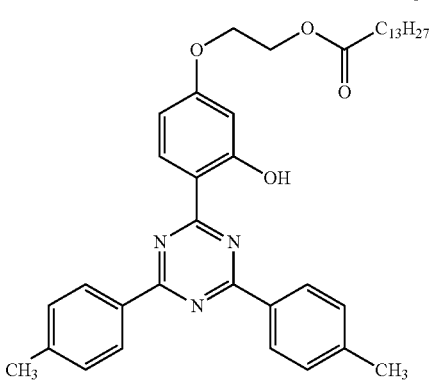

[Chem. 10]

Compound No. 9

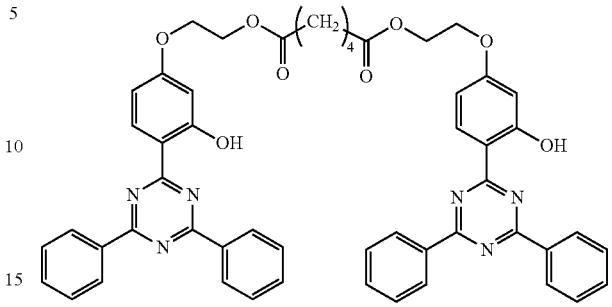

Among the above triazine compounds, compounds wherein n is 1 in the general formula (1) are preferable from the standpoint of compatibility with resins.

The method according to which the triazine compound represented by the general formula (1) is synthesized is not particularly limited, and any commonly-used method for synthesizing triaryltriazine compounds may be used. For example, Compound No. 1, wherein n is 1 in the general formula (1), can be synthesized by esterification of 2-(2-hydroxy-4-(2'-hydroxyethoxy)-4,6-di-(2,4-diphenyl)triazine. Further, Compound No. 9, wherein n is 2 in the general formula (1), can be synthesized by esterification of 2-(2-hydroxy-4-(2'-hydroxyethoxy)-4,6-di-(2,4-diphenyl)triazine and adipic acid.

In the optical film of the present invention, 0.001 to 10 parts by mass, preferably 0.01 to 10 parts by mass, more preferably 0.05 to 5 parts by mass, of the triazine compound is contained with respect to 100 parts by mass of the cellulose ester. A triazine-compound content of less than 0.001 parts by mass cannot sufficiently achieve the effects of the present invention, such as weather resistance, whereas a content of over 10 parts by mass will give rise to deterioration in the resin's physical properties and also to yellowing and degradation in transparency due to bleeding etc., thus not being preferable.

The optical film of the present invention is useful for image display devices such as liquid crystal displays (LCDs), plasma display panels (PDPs), electroluminescence displays (ELDs), cathode-ray tube displays (CRTs), fluorescent display tubes, and field emission displays, and is particularly useful as optical films, such as optical correction films for LCDs and organic EL displays, which employ organic materials with low ultraviolet resistance as their display elements, and protective films for light-emitting elements. Examples of applications for LCDs include protective films for polarizing plates, phase-contrast films, viewing-angle enlarging films, optical correction films, antireflection films, and color-tone adjusting films. The optical film of the present invention has excellent transparency and can easily be made into a film having small refractive-index anisotropy, and can therefore be used suitably particularly for protective films for polarizing plates.

The thickness of the optical film of the present invention can be set as appropriate depending on its application and the resin component. For example, in cases where the optical film is to be used as a protective film for a polarizing plate, the thickness is generally 5 to 500 µm, preferably 10 to 150 µm, and more preferably 20 to 100 µm. A too-thin film may deteriorate the strength, whereas a too-thick sheet may degrade transparency, increase birefringence, and deteriorate outer appearance.

The optical film of the present invention may contain various additives, such as commonly-used antioxidants (e.g., phenol-based, phosphorus-based, or thioether-based antioxidants), other ultraviolet absorbers different from the triazine compound represented by the general formula (1), hindered amine-based light stabilizers, plasticizers, antistatic agents, matte agents, near-infrared absorbers, IR absorbers, slip additives, flame retardants, and processing aids.

Examples of phenol-based antioxidants include 2,6-di-tert-butyl-p-cresol, 2,6-diphenyl-4-octadecyloxyphenol, distearyl(3,5-di-tert-butyl-4-hydroxybenzyl)phosphonate, 1,6-hexamethylene-bis[(3,5-di-tert-butyl-4-hydroxyphenyl) propionic acid amide], 4,4'-thio-bis(6-tert-butyl-m-cresol), 2,2'-methylene-bis(4-methyl-6-tert-butylphenol), 2,2'-methylene-bis(4-ethyl-6-tert-butylphenol), 4,4'-butylidene bis(6-tert-butyl-m-cresol), 2,2'-ethylidene-bis(4,6-di-tert-butylphenol), 2,2'-ethylidene-bis(4-sec-butyl-6-tert-butylphenol), 1,1,3-tris(2-methyl-4-hydroxy-5-tert-butylphenyl)butane, 1,3,5-tris(2,6-dimethyl-3-hydroxy-4-tert-butylbenzyl)isocyanurate, 1,3,5-tris(3,5-di-tert-butyl-4-hydroxybenzyl)isocyanurate, 1,3,5-tris(3,5-di-tert-butyl-4-hydroxybenzyl)-2,4,6-trimethylbenzene, 2-tert-butyl-4-methyl-6-(2-acryloyloxy-3-tert-butyl-5-methylbenzyl) phenol, stearyl(3,5-di-tert-butyl-4-hydroxyphenyl) propionate, thiodiethylene glycol bis[(3,5-di-tert-butyl-4-hydroxyphenyl)propionate], 1,6-hexamethylene-bis[(3,5-di-tert-butyl-4-hydroxyphenyl)propionate], bis[3,3-bis(4-hydroxy-3-tert-butylphenyl)butyric acid]glycol ester, bis[2-tert-butyl-4-methyl-6-(2-hydroxy-3-tert-butyl-5-methylbenzyl)phenyl]terephthalate, 1,3,5-tris[(3,5-di-tert-butyl-4-hydroxyphenyl)propionyloxyethyl]isocyanurate, 3,9-bis[1,1-dimethyl-2-{(3-tert-butyl-4-hydroxy-5-methylphenyl)propionyloxy}ethyl]-2,4,8,10-tetraoxaspiro[5.5] undecane, triethylene glycol bis[(3-tert-butyl-4-hydroxy-5-methylphenyl)propionate], and tocopherol. Preferably 0.001 to 10 parts by mass, more preferably 0.05 to 5 parts by mass, of the phenol-based antioxidant is used with respect to 100 parts by mass of the cellulose ester.

Examples of phosphorus-based antioxidants include tris-nonylphenyl phosphite, tris[2-tert-butyl-4-(3-tert-butyl-4-hydroxy-5-methylphenylthio)-5-methylphenyl]phosphite, tridecyl phosphite, octyldiphenyl phosphite, di(decyl) monophenyl phosphite, di(tridecyl)pentaerythritol diphosphite, di(nonylphenyl)pentaerythritol diphosphite, bis(2,4-di-tert-butylphenyl)pentaerythritol diphosphite, bis(2,6-di-tert-butyl-4-methylphenyl)pentaerythritol diphosphite, bis (2,4,6-tri-tert-butylphenyl)pentaerythritol diphosphite, bis(2,4-dicumylphenyl)pentaerythritol diphosphite, tetra(tridecyl) isopropylidenediphenol diphosphite, tetra(tridecyl)-4,4'-n-butylidene bis(2-tert-butyl-5-methylphenol)diphosphite, hexa(tridecyl)-1,1,3-tris(2-methyl-4-hydroxy-5-tert-butylphenyl)butane triphosphite, tetrakis (2, 4-di-tert-butylphenyl)biphenylene diphosphonite, 9,10-dihydro-9-oxa-10-phosphaphenanthrene-10-oxide, 2,2'-methylene-bis(4,6-tert-butylphenyl)-2-ethylhexyl phosphite, 2,2'-methylene-bis(4,6-tert-butylphenyl)-octadecyl phosphite, 2,2'-ethylidene-bis(4,6-di-tert-butylphenyl)fluoro phosphite, tris (2-[(2,4,8,10-tetrakis-tert-butyldibenzo[d,f][1,3,2]dioxaphosphepin-6-yl)oxy]ethyl)amine, 2-(1,1-dimethylethyl)-6-methyl-4-[3-[[2,4,8,10-tetrakis(1,1-dimethylethyl) dibenzo[d,f][1,3,2]dioxaphosphepin-6-yl]oxy]propyl] phenol, and phosphites of 2-ethyl-2-butylpropylene glycol and 2,4,6-tri-tert-butylphenol. Preferably 0.001 to 10 parts by mass, more preferably 0.01 to 5 parts by mass, of the phosphorus-based antioxidant is used with respect to 100 parts by mass of the cellulose ester.

Examples of thioether-based antioxidants include: dialkyl thiodipropionates such as dilauryl thiodipropionate, dimyristyl thiodipropionate, and distearyl thiodipropionate; and β-alklmercaptopropionates of polyols such as pentaerythritol tetra(β3-dodecylmercaptopropionate). Preferably 0.001 to 10 parts by mass, more preferably 0.01 to 5 parts by mass, of the thioether-based antioxidant is used with respect to 100 parts by mass of the cellulose ester.

Examples of other ultraviolet absorbers include benzotriazole-based ultraviolet absorbers, other triazine-based ultraviolet absorbers, and benzophenone-based ultraviolet absorbers. The amount of such other ultraviolet absorbers used is preferably 0.01 to 10 parts by mass, more preferably 0.05 to 5 parts by mass, with respect to 100 parts by mass of the cellulose ester.

Examples of benzotriazole-based ultraviolet absorbers include 2-(2'-hydroxyphenyl)benzotriazoles such as 2-(2'-hydroxy-5'-methylphenyl)benzotriazole, 2-(2'-hydroxy-3', 5'-di-tert-butylphenyl)-5-chlorobenzotriazole, 2-(2'-hydroxy-3'-tert-butyl-5'-methylphenyl)-5-chlorobenzotriazole, 2-(2'-hydroxy-5'-tert-octylphenyl)benzotriazole, 2-(2'-hydroxy-3',5'-dicumylphenyl)benzotriazole, 2-(2'-hydroxy-3'-tert-butyl-5'-carboxyphenyl)benzotriazole, and 2,2'-methylene-bis(4-tert-octyl-6-benzotriazolyl)phenol.

Examples of other triazine-based ultraviolet absorbers include triaryltriazines such as 2-(2-hydroxy-4-octoxyphenyl)-4,6-bis(2,4-dimethylphenyl)-s-triazine, 2-(2-hydroxy-4-hexyloxyphenyl)-4,6-diphenyl-s-triazine, 2-(2-hydroxy-4-propoxy-5-methylphenyl)-4,6-bis(2,4-dimethylphenyl)-s-triazine, 2-[2-hydroxy-4-(3-dodecyloxy-2-hydroxypropyloxy)phenyl]-4,6-bis(2,4-dimethylphenyl)-s-triazine, 2-[2-hydroxy-4-(3-tridecyloxy-2-hydroxypropyloxy)phenyl]-4,6-bis(2,4-dimethylphenyl)-s-triazine, 2-[2-hydroxy-4-[3-(2-ethylhexyloxy)-2-hydroxypropyloxy]phenyl]-4,6-bis(2,4-dimethylphenyl)-s-triazine, 2-(2-hydroxy-4-hexyloxyphenyl)-4,6-dibiphenyl-s-riazine, 2,4-bis(2-hydroxy-4-octoxyphenyl)-6-(2,4-dimethylphenyl)-s-triazine, 2,4-bis(4-butoxy-2-hydroxyphenyl)-6-(2,4-dibutoxyphenyl)-s-triazine, and 2,4, 6-tris(2-hydroxy-4-octoxyphenyl)-s-triazine.

Examples of benzophenone-based ultraviolet absorbers include 2-hydroxybenzophenones such as 2,4-dihydroxybenzophenone, 2-hydroxy-4-methoxybenzophenone, 2-hydroxy-4-octoxybenzophenone, and 5,5'-methylene-bis(2-hydroxy-4-methoxybenzophenone).

Examples of hindered amine-based light stabilizers include hindered amine compounds such as 2,2,6,6-tetramethyl-4-piperidylstearate, 1,2,2, 6,6-pentamethyl-4-piperidylstearate, 2,2,6,6-tetramethyl-4-piperidylbenzoate, bis (2,2,6,6-tetramethyl-4-piperidyl)sebacate, bis(1,2,2,6,6-pentamethyl-4-piperidyl)sebacate, tetrakis(2,2,6,6-tetramethyl-4-piperidyl)butane tetracarboxylate, tetrakis(1, 2,2,6,6-pentamethyl-4-piperidyl)butane tetracarboxylate, bis (2,2,6,6-tetramethyl-4-piperidyl)-di(tridecyl)-1,2,3,4-butane tetracarboxylate, bis(1,2,2,6,6-pentamethyl-4-piperidyl)-di (tridecyl)-1,2,3,4-butane tetracarboxylate, bis(1,2,2,6,6-pentamethyl-4-piperidyl)-2-butyl-2-(3,5-di-tert-butyl-4-hydroxybenzyl)malonate, 1-(2-hydroxyethyl)-2,2,6,6-tetramethyl-4-piperidinol/diethyl succinate polycondensate, 1,6-bis(2,2,6,6-tetramethyl-4-piperidylamino)hexane/dibromoethane polycondensate, 1,6-bis(2,2,6,6-tetramethyl-4-piperidylamino)hexane/2,4-dichloro-6-morpholino-s-triazine polycondensate, 1,6-bis(2,2,6,6-tetramethyl-4-piperidylamino)hexane/2,4-dichloro-6-tert-octylamino-s-triazine, 1,5,8,12-tetrakis[2,4-bis(N-butyl-N-(2,2,6,6-tetramethyl-4-piperidyl)amino)-s-triazin-6-yl]-1,5,8,12-tetraazadodecane, 1,5,8,12-tetrakis[2,4-bis(N-butyl-N-(1,2,2,6,6-pentamethyl-4-piperidyl)amino)-s-triazin-6-yl]-1,5,8,12-tetraazadodecane, 1,6,11-tris[2,4-bis(N-butyl-N-(2,2,6,6-tetramethyl-4-piperidyl)amino)-s-triazin-6-ylaminoundecane, 1,6,11-tris [2,4-bis(N-butyl-N-(1,2,2,6, 6-pentamethyl-4-piperidyl) amino)-s-triazin-6-ylaminoundecane, bis(1-octyloxy-2,2,6, 6-tetramethylpiperidin-4-yl)sebacate, bis(1-undecyloxy-2,2, 6,6-tetramethylpiperidin-4-yl)carbonate, and condensates of 1,6-diaminohexane and 2,4,6-trichloro-1,3,5-triazine, as well as N,N-dibutylamine and 4-butylamino-2,2,6,6-tetramethylpiperidine. Preferably 0.001 to 10 parts by mass, more preferably 0.01 to 5 parts by mass, of the hindered amine-based light stabilizer is used with respect to 100 parts by mass of the cellulose ester.

Various types of known plasticizers may be used depending on the type of resin used. Examples of ester-based plasticizers include compounds obtained by diesterification of a dibasic acid, such as phthalic acid, naphthalene dicarboxylic acid, succinic acid, glutaric acid, adipic acid, or maleic acid, and an alkyl alcohol, such as octanol, isononyl alcohol, lauryl alcohol, or stearyl alcohol, or an ether alcohol, such as diethylene glycol monobutyl ether. Examples of polyester-based plasticizers include polyesters made from the above-described dibasic acid and a glycol such as ethylene glycol, propylene glycol, butanediol, neopentyl glycol, or hexanediol, or polyesters whose ends have been capped with the above-described monoalcohol or a monocarboxylic acid compound, such as propionic acid, octylic acid, or benzoic acid. Examples of polyether plasticizers include polyethers such as polyethylene glycol or polypropylene glycol; and examples of polyether/ester-based plasticizers include polyesters made from a polyether, such as polyethylene glycol or polypropylene glycol, and the above-described dibasic acid. Preferably 1 to 25 parts by mass, more preferably 2 to 20 parts by mass, of the plasticizer is used with respect to 100 parts by mass of the cellulose ester.

Examples of antistatic agents include: cationic antistatic agents such as fatty acid quaternary ammonium salts and quaternary polyamine salts; anionic antistatic agents such as higher alcohol phosphate salts, higher alcohol EO adducts, polyethylene glycol fatty acid esters, anionic alkyl sulfonates, higher alcohol sulfate salts, higher alcohol-ethylene oxide adduct sulfate salts, and higher alcohol-ethylene oxide adduct phosphate salts; nonionic antistatic agents such as polyol fatty acid esters, polyglycol phosphoric esters, and polyoxyethylene alkylallyl ethers; and amphoteric antistatic agents such as amphoteric alkyl betaines, e.g. betaine alkyldimethylaminoacetate, and imidazoline-type amphoteric activators. A single type of antistatic agent, or a combination of two or more types of antistatic agents, may be used. Preferably 0.001 to 10 parts by mass, more preferably 0.01 to 5 parts by mass, of antistatic agent is used with respect to 100 parts by mass of cellulose ester.

Examples of matte agents include particulates of inorganic compounds, such as silicon dioxide, titanium dioxide, aluminum oxide, zirconium oxide, calcium carbonate, calcium carbonate, talc, clay, calcined kaoline, calcined calcium silicate, hydrate calcium silicate, aluminum silicate, magnesium silicate, and calcium phosphate.

The optical film of the present invention may preferably be subjected to anti-blocking processing to facilitate handling and/or to anti-glare processing to prevent glare, and a concrete example therefor may be to add a powder of inorganic particulates such as silicon oxide, titanium oxide, iron oxide, alumina, calcium carbonate, or zinc oxide, or a powder of organic particulates such as benzoguanamine.

Also, the optical film of the present invention may be subjected to various surface treatments. Examples of surface treatments include chemical treatment such as alkaline saponification, mechanical treatment, corona discharge treatment, flame treatment, ultraviolet irradiation treatment, high-frequency treatment, glow discharge treatment, active plasma treatment, laser treatment, mixed acid treatment, and ozone oxidation treatment. The surface treatment may render a multitude of projections-and-depressions and/or lines on the surface of the optical film.

EXAMPLES

The present invention will be described in further detail below according to Examples and Comparative Examples thereof. The present invention, however, is not to be limited to these Examples etc.

Examples 1 and 2, Comparative Examples 1 to 4

Cellulose ester films containing respective ultraviolet absorbers as shown in Table 1 below were prepared by casting described below. The weather resistance (yellow index (discolouration) and time for rupture of each film) was evaluated for each film. The results are also shown in Table 1.

Casting:

To a 25 ml volumetric flask were placed 1.25 g of triacetyl cellulose resin (Daicel Chemical Industries, Ltd.; Trade Name: "LT-35") dried for 6 hours at 120° C. and 6.25 g (0.5 phr) of the ultraviolet absorber shown in Table 1 below, and dichloromethane was added up to the calibration line, to prepare a dichloromethane solution of triacetyl cellulose containing 0.5 phr of the ultraviolet absorber. The solution was left for 1 hour at room temperature to allow the components to dissolve, and then 4 ml of this solution was placed into a petri dish (diameter: 60 mm) with a whole pipette and was dried for 24 hours at room temperature. The obtained film was peeled off from the petri dish, to obtain a 50-μm-thick test specimen of triacetyl cellulose film.

Weather Resistance Evaluation Method:

The weather resistance of each film was evaluated using a Xenon Weather-Meter (product of Atlas MTT) at a black panel temperature of 89° C. under "no rain" conditions, by: measuring the yellow index (Y. I.) every 120 hours; and visually observing the time for rupture (hour) of each film.

Yellow Index (Y. I. and ΔE):

The yellow index (Y. I.) was measured using a colorimeter from Suga Test Instruments Co., Ltd.

Time for Rupture of Film (Hour):

Visual observation was performed every 120 hours to find the time at which the film ruptured.

TABLE 1

| UV Absorber | | Example 1 Compound | | Example 2 Compound | | Comparative Example 1 Compound | | Comparative Example 2 Compound | | Comparative Example 3 Compound | | Comparative Example 4 | |
|---|---|---|---|---|---|---|---|---|---|---|---|---|---|
| | (Time | No. 1 | | No. 5 | | No. 10 | | No. 11 | | No. 12 | | Not Added | |
| | Tested) | Y.I | ΔE | Y.I | ΔE | Y.I | ΔE | Y.I | ΔE | Y.I | ΔE | Y.I | ΔE |
| Yellow | 480 hr | 1 | 0.4 | 0.9 | 0.3 | 0.9 | 0.1 | 1.1 | 0.6 | 1.5 | 1.3 | 1.2 | 1.8 |
| Index | 960 hr | 0.8 | 0.6 | 0.8 | 0.5 | 1.2 | 0.4 | 1.3 | 0.8 | 1.4 | 0.8 | 1.8 | 0.6 |
| | 1680 hr | 1.3 | 0.9 | 1.4 | 0.7 | 1.3 | 0.5 | 1.5 | 0.7 | 1.8 | 1.1 | — | — |
| | 2160 hr | 1.4 | 0.6 | 1.5 | 0.6 | 1.8 | 0.6 | 1.6 | 0.7 | 1.9 | 0.8 | — | — |

TABLE 1-continued

| UV Absorber | Example 1 Compound | | Example 2 Compound | | Comparative Example 1 Compound | | Comparative Example 2 Compound | | Comparative Example 3 Compound | | Comparative Example 4 | |
|---|---|---|---|---|---|---|---|---|---|---|---|---|
| (Time | No. 1 | | No. 5 | | No. 10 | | No. 11 | | No. 12 | | Not Added | |
| Tested) | Y.I | ΔE | Y.I | ΔE | Y.I | ΔE | Y.I | ΔE | Y.I | ΔE | Y.I | ΔE |
| 2400 hr | 1.4 | 0.6 | 1.5 | 0.6 | 1.7 | 0.7 | — | — | 2.3 | 1.1 | — | — |
| 3480 hr | 1.7 | 0.6 | 1.7 | 0.6 | — | — | — | — | — | — | — | — |
| Time for Rupture (hr) | 3480 | | 3000 | | 2400 | | 2160 | | 2400 | | 960 | |

[Chem. 11]

Compound No. 1

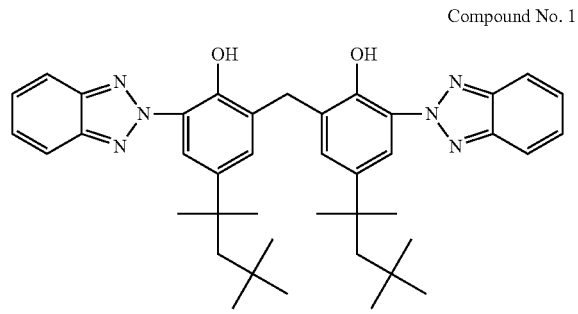

[Chem. 12]

Compound No. 11

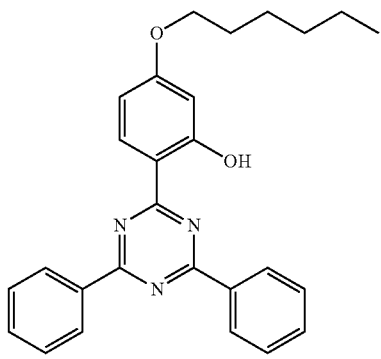

[Chem. 13]

Compound No. 12

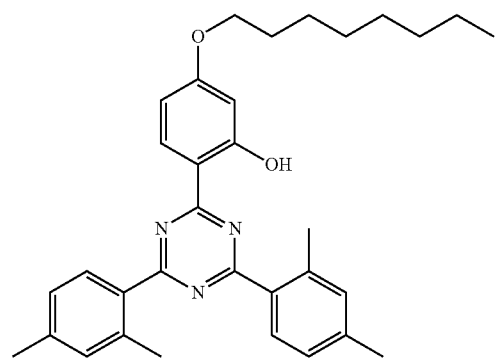

Reference Examples (Compound's Volatility Evaluation):

As Reference Examples 1 and 2, the volatility of the above Compounds No. 1 and No. 5 was evaluated through differential thermal analysis. Table 2 shows the results of the weight decrease rate (%) at 250° C. and the temperature (° C.) at which the weight decreased by 5%.

TABLE 2

| | UV Absorber | Reference Example 1 Compound No. 1 | Reference Example 2 Compound No. 5 |
|---|---|---|---|
| Differential Thermal Analysis | Weight Decrease Rate at 250° C. (%) | 0.02 | 0.01 |
| | 5% Weight Decrease Temperature (° C.) | 343 | 351 |

The results shown in Table 1 reveal that Examples 1 and 2 each containing the triazine compound according to the present invention exhibit excellent properties in terms of yellow index and rupture time evaluation, far superior to the Comparative Examples containing other ultraviolet absorbers structured differently from the triazine compound of the present invention. In particular, the results regarding rupture time show that the films containing the triazine compound of the present invention have a weather resistance that is around 1.5 times that of films containing other ultraviolet absorbers, which clearly shows that the present invention exhibits remarkable effects.

Further, the results of differential thermal analysis shown in Table 2 reveal that there is almost no decrease in weight at 250° C., which is the processing temperature in case of producing the cellulose ester film by melt processing. This suggests that the triazine compound of the present invention exhibits no volatility even in case of producing the film by melt processing, thus allowing production of an ultraviolet-absorber-containing film with good quality.

The present invention can provide cellulose ester optical films having excellent weather resistance, which can serve usefully as optical films such as protective films for polarizing plates.

The invention claimed is:

1. An optical film comprising, with respect to 100 parts by mass of a cellulose ester, 0.001 to 10 parts by mass of a triazine compound represented by the following general formula (1) as an ultraviolet absorber:

[Chem. 1]

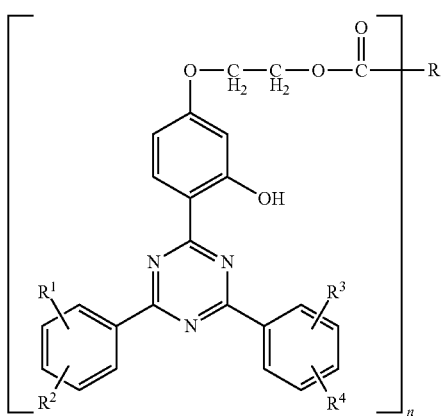

(1)

wherein, n is an integer of 1 to 4; where n is 1, R represents a 2-ethylhexyl group; where n is 2 to 4, R represents a residue obtained by removing 2,3, or 4 carboxylic acid groups from a $C_{1-34}$ aliphatic or aromatic polybasic acid; and $R^1$, $R^2$, $R^3$, and $R^4$ each independently represent a hydrogen atom or a $C_{1-4}$ alkyl group, and wherein the optical film is a protective film for a polarizing plate.

2. The optical film according to claim 1, wherein n in the above general formula (1) is 1.

3. The optical film according to claim 1, characterized by being produced by casting.

4. The optical film according to claim 1, characterized by being produced by melt processing.

5. The optical film according to claim 2, characterized by being produced by casting.

6. The optical film according to claim 2, characterized by being produced by melt processing.

7. The optical film according to claim 1, wherein the cellulose ester is triacetyl cellulose.

* * * * *